United States Patent
Joshi et al.

(10) Patent No.: US 9,749,223 B2
(45) Date of Patent: Aug. 29, 2017

(54) LINEAR PATH PROTECTION IN A CENTRALIZED CONTROLLER ENVIRONMENT

(71) Applicants: Mandar Joshi, Sunnyvale, CA (US);
Pasula Reddy, Sunnyvale, CA (US);
Virgil Vladescu, Pearl River, NY (US);
Don O'Connor, McKinney, TX (US)

(72) Inventors: Mandar Joshi, Sunnyvale, CA (US);
Pasula Reddy, Sunnyvale, CA (US);
Virgil Vladescu, Pearl River, NY (US);
Don O'Connor, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 14/333,183

(22) Filed: Jul. 16, 2014

(65) Prior Publication Data

US 2016/0020942 A1 Jan. 21, 2016

(51) Int. Cl.
| | | |
|---|---|---|
| *G01R 31/08* | (2006.01) | |
| *H04J 1/16* | (2006.01) | |
| *H04L 1/00* | (2006.01) | |
| *H04L 12/703* | (2013.01) | |
| *H04L 12/24* | (2006.01) | |

(52) U.S. Cl.
CPC .......... *H04L 45/28* (2013.01); *H04L 41/0659* (2013.01)

(58) Field of Classification Search
CPC ...................................................... H04L 45/22
See application file for complete search history.

(56) References Cited

U.S. PATENT DOCUMENTS

| | | | | |
|---|---|---|---|---|
| 6,370,110 B1 * | 4/2002 | Eslambolchi | ........... | H04J 3/085 370/216 |
| 8,804,490 B2 * | 8/2014 | Tatipamula | ............. | H04L 41/12 370/218 |
| 2003/0145246 A1 * | 7/2003 | Suemura | ............... | H04L 12/437 714/2 |
| 2005/0013241 A1 * | 1/2005 | Beller | ...................... | H04J 3/085 370/216 |
| 2008/0095047 A1 * | 4/2008 | Skalecki | ............. | H04L 41/0668 370/225 |
| 2009/0290487 A1 * | 11/2009 | Takatori | .............. | G06F 11/2007 370/225 |
| 2015/0229550 A1 * | 8/2015 | Addeo | .................... | H04L 43/10 709/224 |

OTHER PUBLICATIONS

Neda et al. (IEEE, 2012, Fast failover for control Traffic in software defined networks, entire documnet).*

* cited by examiner

*Primary Examiner* — Maharishi Khirodhar
(74) *Attorney, Agent, or Firm* — Baker Botts L.L.P.

(57) ABSTRACT

A method and system for protection switching distributes responsibility for action between a central controller and network elements at endpoints of a linear point-to-point network path. The central controller may be configured to support protection switching by network elements at endpoints of a linear point-to-point path, such that the network elements perform protection switching independently and without direct involvement and/or dependency of the central controller. Simultaneously, the central controller may remain aware of network element actions, events, and states with regard to protection switching, by receiving corresponding notifications from the network elements.

18 Claims, 7 Drawing Sheets

LINEAR PATH PROTECTION IN A CENTRALIZED CONTROLLER ENVIRONMENT

BACKGROUND

Field of the Disclosure

The present disclosure relates to communications systems and more specifically to linear path protection in a centralized controller environment.

Description of the Related Art

A communication network may include network elements that route packets through the network. Some network elements may include a distributed architecture, wherein packet processing may be distributed among several subsystems of the network element (e.g., line cards). Thus, network elements may be modular and may include various subsystems and/or subelements, which may be represented as logical and/or physical entities. The logical and/or physical entities included in a network element may refer to the network element, a shelf, a slot, a port, a channel and/or various combinations thereof.

Throughout the network, linear point-to-point paths between two network elements may be provisioned for carrying network traffic. A primary linear point-to-point path, referred to as a "working path" may be protected with a "protect path" that is a secondary or redundant path between the same network endpoints. In the event of a failure of the working path, for example, a protection switch may be performed to switch from the working path to the protect path, thereby maintaining network service between the endpoints.

Furthermore, software-defined networking (SDN) represents an important step towards network virtualization and/or abstraction and may allow for a logical network entity to be instantiated automatically using software instructions, rather than manually from user input. In this manner, SDN may enable flexible definition of virtual networks. For example, using the OpenFlow communications protocol managed by The Open Network Foundation (ONF) to implement SDN, a traffic flow entity may be instantiated using an arbitrary combination of layer identifiers defined in a header space. OpenFlow may use various combinations of traffic identifiers (Internet-protocol (IP) addresses, media access controller (MAC) addresses, port addresses, etc.) at various layers to define a traffic flow. Then, by installing and configuring packet-forwarding rules associated with the flow to network elements, an OpenFlow controller may ensure that the traffic flow entity instantiates a path that is routed through a network including the corresponding network elements.

In an SDN environment with a central controller, linear point-to-point protection switching, when implemented and controlled by the central controller, may take substantially more time to execute than is desirable for carrier-class network services, at least in part due to communication overhead between the central controller and the respective network element endpoints.

BRIEF DESCRIPTION OF THE DRAWINGS

For a more complete understanding of the present invention and its features and advantages, reference is now made to the following description, taken in conjunction with the accompanying drawings, in which.

SUMMARY

In one aspect, a disclosed method for linear path protection for a network monitored by a central controller includes provisioning, at a first network element, a working path and a protect path routed between the first network element and a second network element, and notifying, by the first network element, the central controller with an indication of the working path and the protect path. The working path and the protect path may both be active. The working path may be selected and the protect path may be de-selected. The method may include detecting, by the first network element, that the working path is inactive. Responsive to the detecting that the working path is inactive, the method may further include switching, by the first network element, the working path from selected to de-selected and the protect path from de-selected to selected. The method may also include notifying, by the first network element, the central controller that the working path is inactive and de-selected and that the protect path is selected.

Additional disclosed aspects for linear path protection for a network monitored by a central controller include a network element, a system including a network element and a central controller, and an article of manufacture comprising non-transitory computer readable memory media storing processor-executable instructions.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

Figure 1:
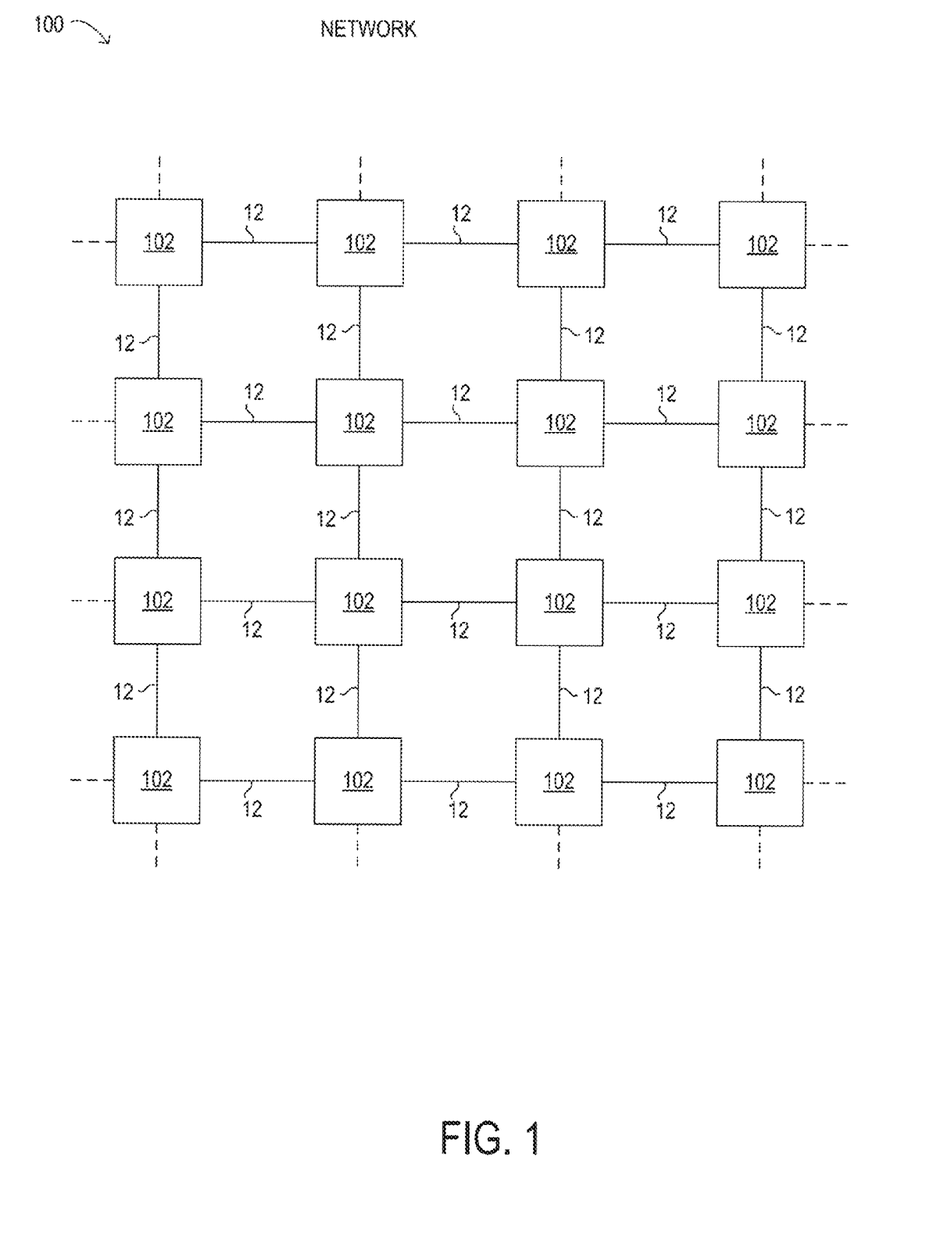
FIG. 1 is a block diagram of selected elements of an embodiment of a network.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 6.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100, or certain portions thereof, may be managed by a central controller. The central controller may implement a control plane (see FIG. 2), for example. In certain embodiments, the central controller is an SDN controller, such as an OpenFlow controller. As will be described in further detail herein, the central controller may be configured to support protection switching by network elements at endpoints of a linear point-to-point path, such that the network elements perform protection switching independently and without direct involvement and/or dependency of the central controller. Simultaneously, the central controller may remain aware of network element actions, events, and states with regard to protection switching, by receiving corresponding notifications from the network elements. In this manner, advantages of fast and independent protection switching by networks elements may be achieved along with advantages of centralized control. Furthermore, complexity of communication between network elements and the central controller may be reduced compared to previously used methods, which may improve performance and reduce complexity at both the central controller and the network element.

Figure 2:
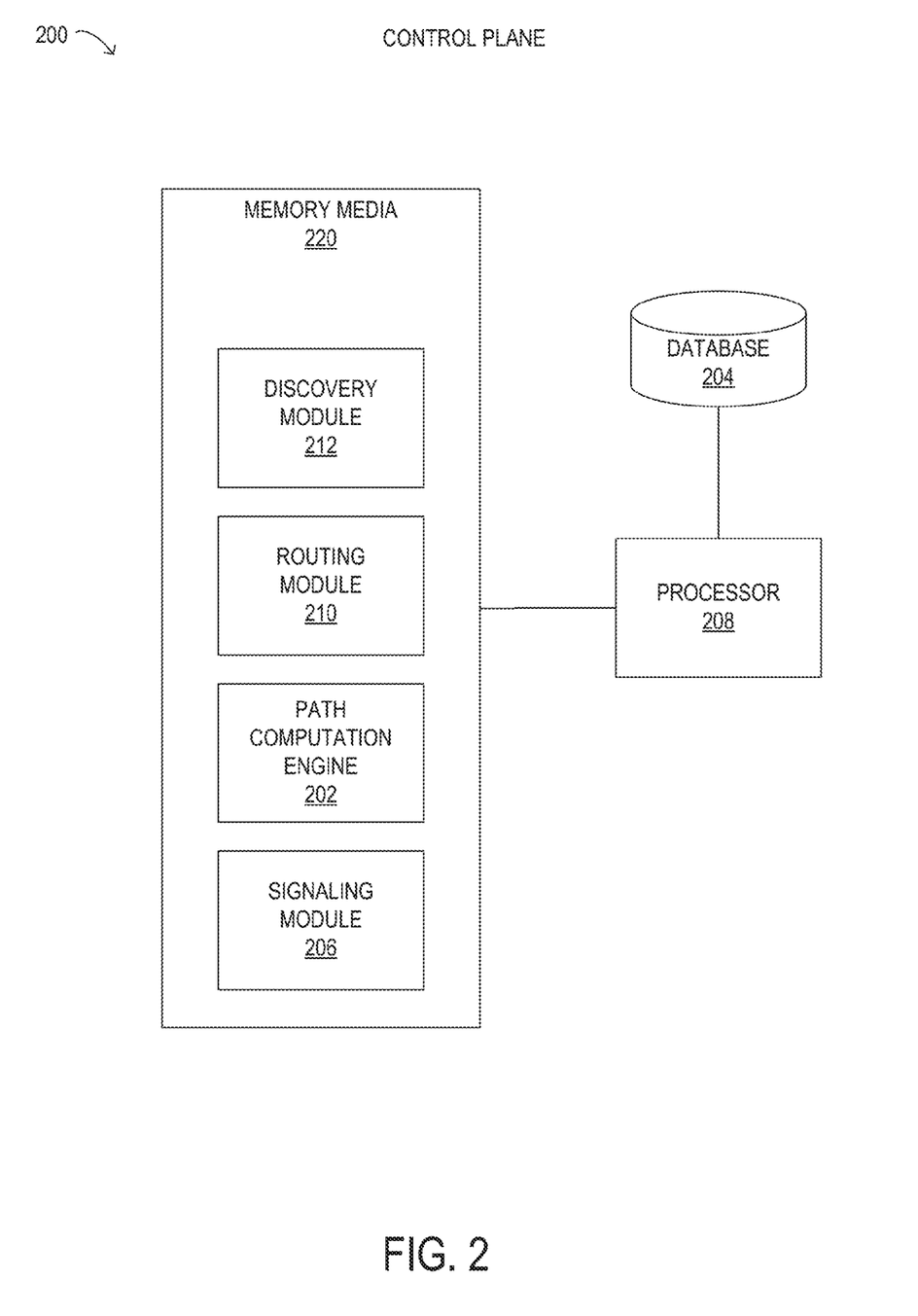
FIG. 2 is a block diagram of selected elements of an embodiment of a control plane.

Turning now to FIG. 2 a block diagram of selected elements of an embodiment of control system 200 for implementing control plane functionality in networks, such as, for example, in network 100 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within network 100, which may be at least in part an optical network. Discovery module 212 may discover local links connecting to neighbors. Routing module 210 may broadcast local link information to network nodes while populating database 204. When a request for service from network 100 is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. In some embodiments, signaling module 206, in conjunction with path computation engine 202, discovery module 212, and/or routing module 210, may represent instructions and/or code for implementing various algorithms according to the present disclosure.

In certain embodiments, control system 200 may be configured to interface with a person (i.e., a user) and receive data about the signal transmission path. For example, control system 200 may also include and/or may be coupled to one or more input devices and/or output devices to facilitate receiving data about the signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control system 200 may be configured to receive data about the signal transmission path from a device such as another computing device and/or a network element (not shown in FIG. 2).

As shown in FIG. 2, in some embodiments, discovery module 212 may be configured to receive data concerning an signal transmission path in a network and may be responsible for discovery of neighbors and links between neighbors. In other words, discovery module 212 may send discovery messages according to a discovery protocol, and may receive data about the signal transmission path. In some embodiments, discovery module 212 may determine features, such as, but not limited to, media type; media length; number and/or type of components; data rate; modulation format of the data; input power of an optical signal; number of optical signal carrying wavelengths (i.e., channels); channel spacing; traffic demand; and/or network topology, among others.

As shown in FIG. 2, routing module 210 may be responsible for propagating link connectivity information to various nodes within a network, such as network 100. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may be configured to use the information provided by routing module 210 to database 204 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 202 may consider the interplay between various transmission degradation factors. In various embodiments, path computation engine 202 may generate values for specific transmission degradation factors. Path computation engine 202 may further store data describing the signal transmission path in database 204.

In FIG. 2, signaling module 206 may provide functionality associated with setting up, modifying, and tearing down end-to-end networks services in network 100. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In one embodiment of control system 200, signaling module 206, for example, may implement a controller state machine (see also FIG. 5) for supporting linear path protection in a centralized controller environment for each respective network element, as described herein.

Figure 3:
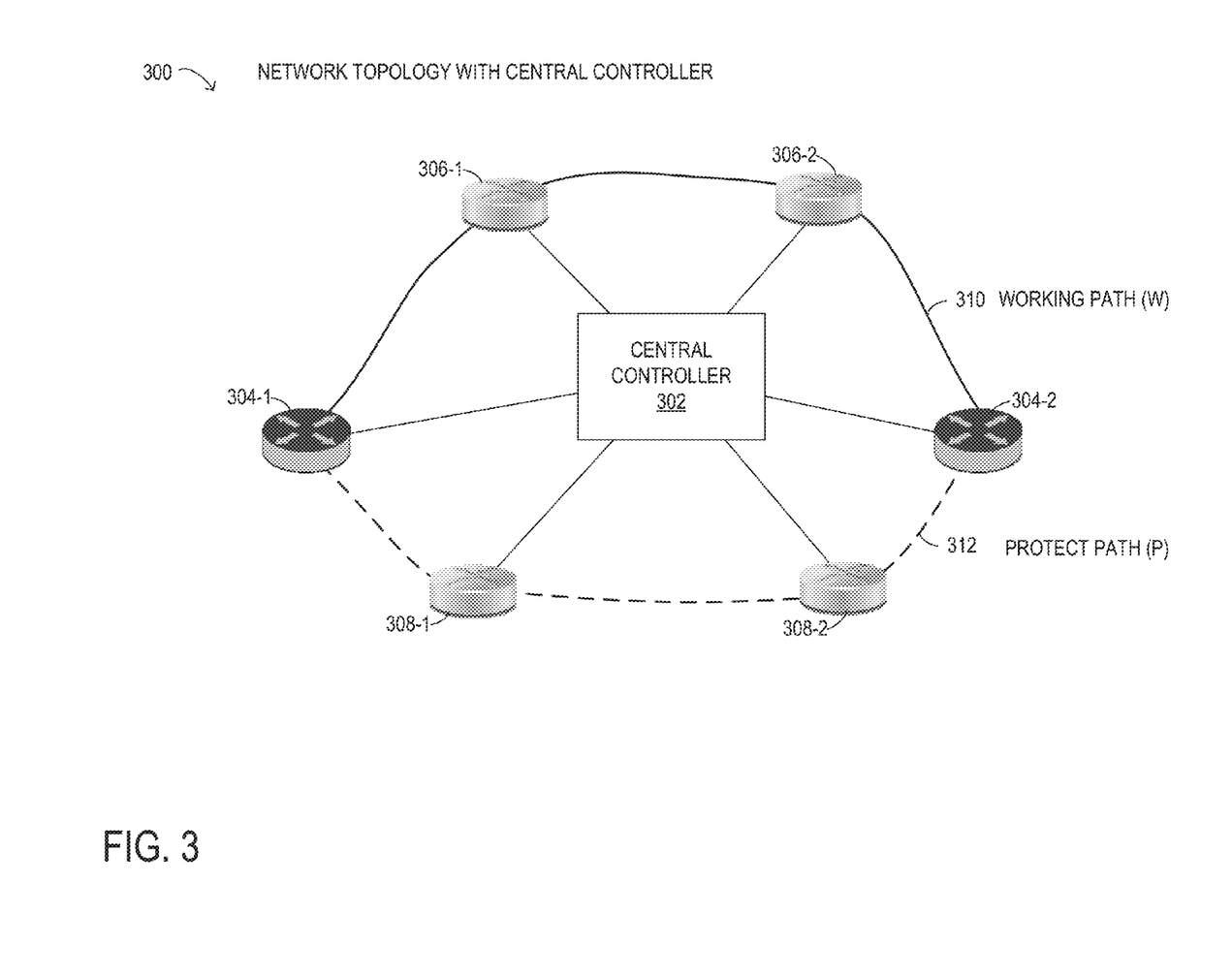
FIG. 3 is a block diagram of selected elements of an embodiment of a network topology with a central controller.

Turning now to FIG. 3, a block diagram of selected elements of an embodiment of network topology 300 with central controller 302 is illustrated. In various embodiments, central controller 302 may represent at least a portion of control system 200 (see FIG. 2). As shown, central controller 302 may be in communication with network elements 304, 306, 308, representing various different network elements in a network, such as network 100 (see FIG. 1).

In network topology 300 in FIG. 3, network elements 304 may represent endpoints of a network path (i.e., a signal transmission path), which may include at least one optical path and/or at least one electrical path. Thus, network element 304-1 may represent a first network element that is an endpoint, while network element 304-2 may represent a second network element that is another endpoint. Between network elements 304-1 and 304-2, network topology 300 includes working path (W) 310 and protect path (P) 312, which may be used for protection switching, as described herein. Working path 310 may be routed over intermediate network elements 306, while protect path 312 may be routed over intermediate network elements 308. Although working path 310 is shown with two intermediate network elements 306-1, 306-2, it will be understood that in different embodiments, different numbers of intermediate network elements 306 may be used to route working path 310. Similarly, while protect path 312 is shown with two intermediate network elements 308-1, 308-2, it will be understood that in different embodiments, different numbers of intermediate network elements 308 may be used to route protect path 312.

As will be described in further detail, in operation, network elements 304 and central controller 302 may implement linear path protection in a centralized controller environment, as described herein. Specifically, network elements 304, while being managed by central controller 302, may independently implement and/or execute certain protection switching actions to switch between working path 310 and protect path 312. Furthermore, network element 304-1 and 304-2 may simultaneously perform protection switching substantially independent of each other, while both implementing the same protection switching operations. Accordingly, as used herein, "a first network element" may refer to an arbitrary one of network elements 304-1 and 304-2, while "a second network element" may refer to the other network element. Network elements 304 may send notifications to central controller 302 of events and actions taken, and may receive and execute commands from central controller 302. Central controller 302 may receive notifications from network elements 304 with regard to working path 310 and protect path 312 and may track operations and states of network elements 304. In this manner, advantages of centralized management as well as advantages of rapid autonomous protection switching by network elements may be realized.

Figure 4:
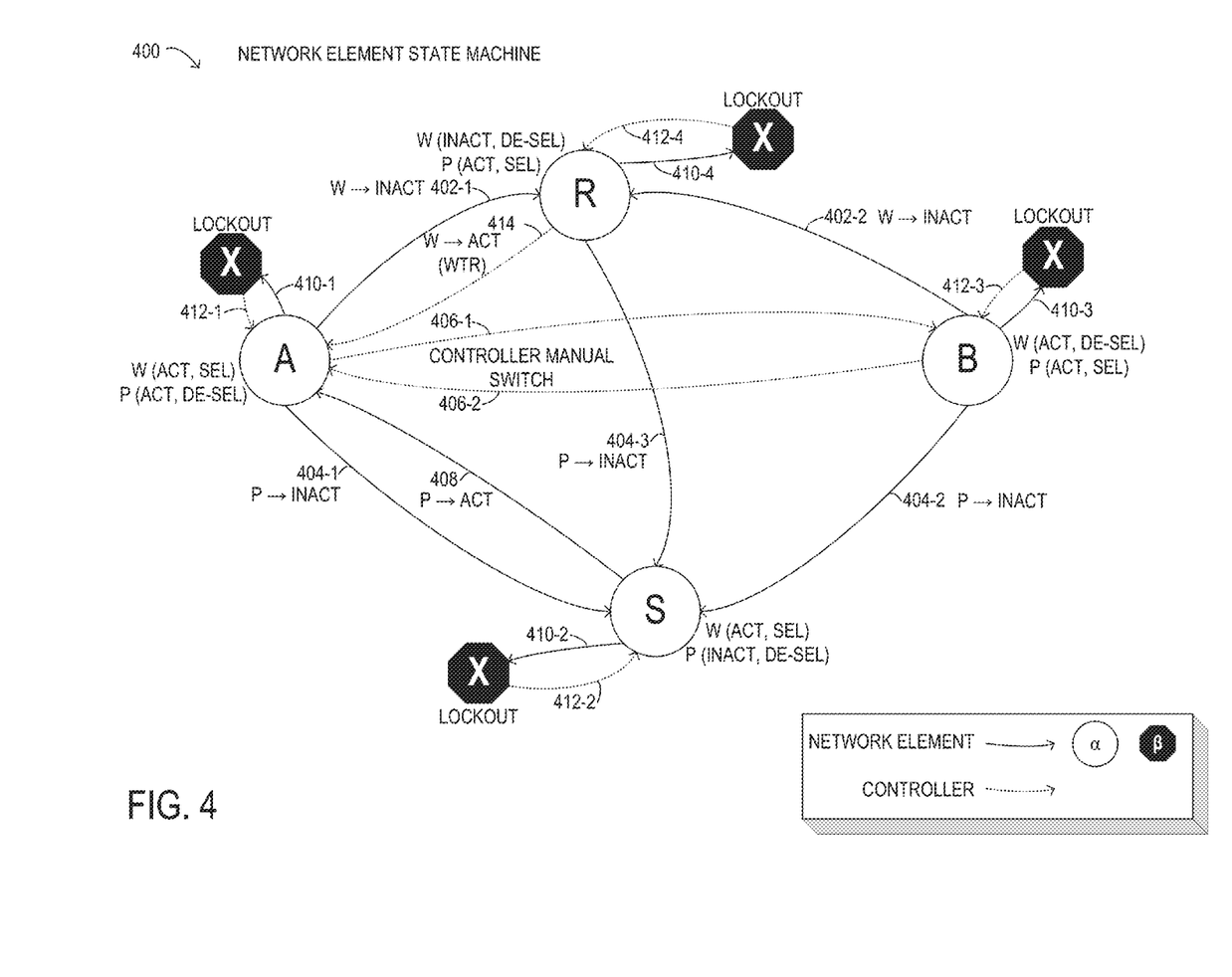
FIG. 4 is a state diagram of selected elements of an embodiment of a network element state machine.

Advancing now to FIG. 4, a state diagram of selected elements of an embodiment of network element state machine 400 is illustrated. As shown, network element state machine 400 may represent actions, events, and states implemented by an endpoint network element during protection switching, such as network element 304 (see FIG. 3), according to the methods described herein. In network element state machine 400, solid lines for states and arrows, representing transitions between states, depict actions taken autonomously by network element 304, while dashed lines depict actions taken by central controller 302. Network element state machine 400 may operate in conjunction with controller state machine 500 (see FIG. 5), as described below. It is noted that certain elements depicted in network element state machine 400 may be rearranged or omitted in various embodiments. Also, network element state machine 400 may represent a subset of actions and states that network element 304 is enabled to implement for operational purposes.

Figure 5:
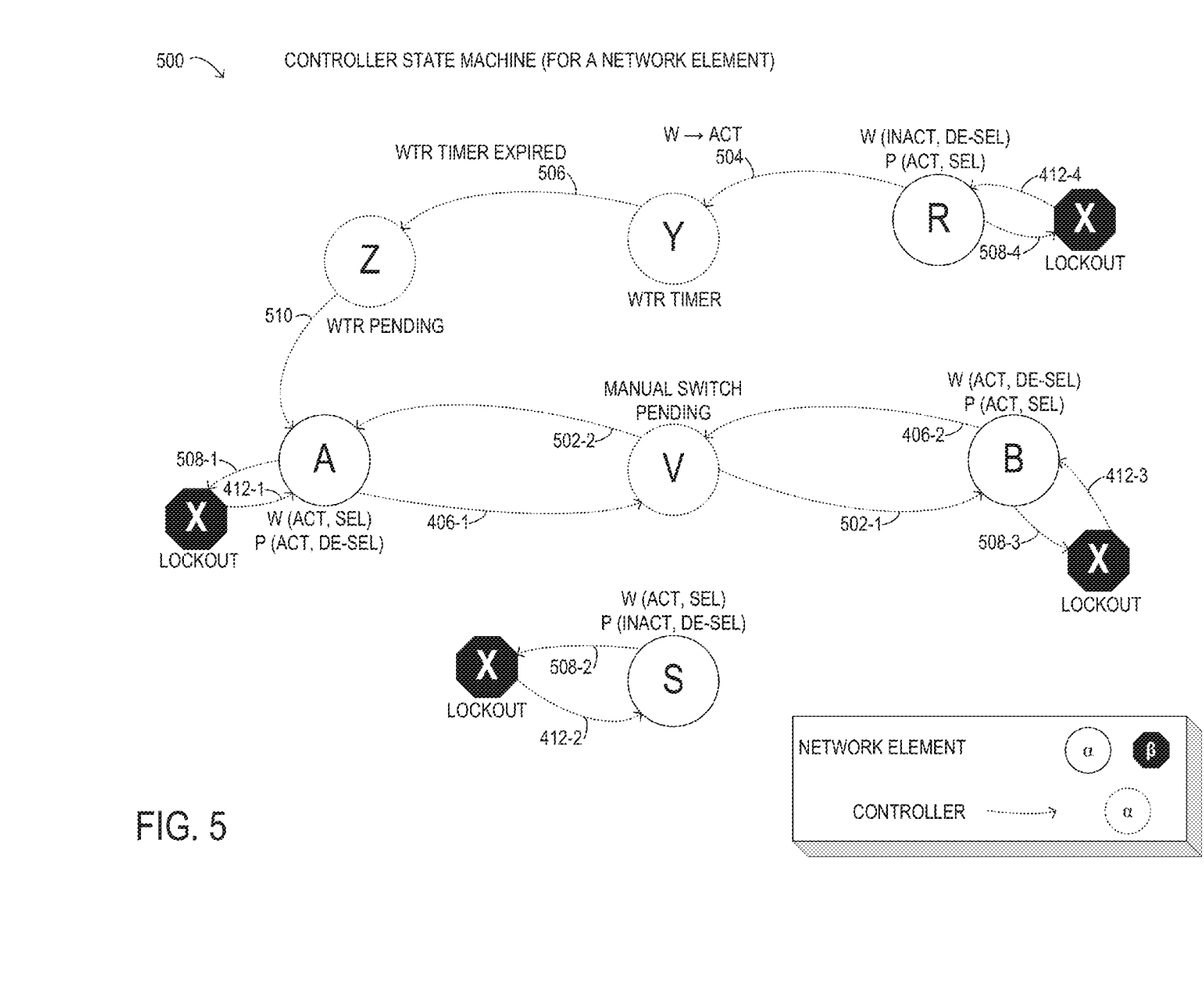
FIG. 5 is a state diagram of selected elements of an embodiment of a controller state machine.

In FIG. 4, states A, B, R, and S represent specific protection switching network element (NE) states with respect to working path (W) and protect path (P) (see also FIG. 3), as presented below in Table 1.

TABLE 1

Protection Switching NE States (see FIGS. 4 and 5)

| NE State | Working Path W | Protect Path P |
|---|---|---|
| A | ACTive, SELected | ACTive, DE-SELected |
| B | ACTive, DE-SELected | ACTive, SELected |
| R | INACTive, DE-SELected | ACTive, SELected |
| S | ACTive, SELected | INACTive, DE-SELected |

Each NE state may have two parameters for W and P. A condition parameter may have the values [active, inactive] or [ACT, INACT] indicating an operational condition of the network path, where active or ACT indicates that the path is operational to carry network traffic, while inactive or INACT indicates that the path is not-operational and/or is in an error or failure condition. In some embodiments, inactive or ACT may be used when a data error rate over the path exceeds a desired value. Accordingly, condition parameter values for W and P are determined based on a path condition, respectively, and both paths may have the same or different values for the condition parameter in an NE state. A selection parameter may have the values [selected, de-selected] or [SEL, DE-SEL] indicating which of W and P is currently selected for carrying network traffic. Accordingly, only one of W and P may have the value selected or SEL in any NE state, while the other one of W and P must have the value de-selected or DE-SEL. When the network element changes values for the selection parameter, a corresponding protection switch event may be initiated and executed by the network element. Furthermore, after successful completion of an NE state transition, such as described with respect to network element state machine 400, the network element may send a corresponding notification that the NE state transition was performed to the central controller. In this manner, the central controller may remain synchronized with network element state machine 400 and may maintain accurate state information for the network element.

As shown in network element state machine 400, in normal operation, the network element may remain in NE state A, which may represent a ground state or a normal state, with W active and selected and P active and de-selected. The network element may switch to NE state B responsive to receiving a controller command 406-1 from the central controller, representing a controller manual switch (see also FIG. 5). The network element may switch from NE state B to NE state A responsive to receiving controller command 406-2 in a similar controller manual switch. Because both W and P are active in NE states A and B, the transition between NE states A and B may not be involved with an actual protection switch event that is detected and autonomously executed by the network element.

In network element state machine 400 of FIG. 4, the network element may transition from NE state A to NE state R responsive to detecting event 402-1, representing W becoming inactive. When W transitions back from inactive to active, a special wait-to-restore (WTR) function may be implemented on the central controller resulting in controller command 414 (see also FIG. 5), to which the network element may respond by transitioning from NE state R to NE state A. When in NE state A and upon detecting event 404-1, representing P becoming inactive, the network element may transition from NE state A to NE state S. When in NE state S and upon detecting event 408, representing P becoming active, the network element may transition from NE state S to NE state A. When in NE state R and upon detecting event 404-3, representing P becoming inactive, the network element may transition from NE state R to NE state S. When in NE state B and upon detecting event 404-2, representing P becoming inactive, the network element may transition from NE state B to NE state S. When in NE state B and upon detecting event 402-2, representing W becoming inactive, the network element may transition from NE state B to NE state R.

Also shown in network element state machine 400 is lockout state (NE state X), which may be activated by the network element with lockout command 410 from any of NE states A, B, R, and S. In NE state X (lockout), the condition parameters and selection parameters for W and P may remain unchanged, but all network traffic may be suppressed for the network element. NE state X may be released and the network element may return to the NE state prior to lockout responsive to receiving clear command 412 from the central controller (see also FIG. 5). Thus, a transition from NE state A to NE state X may occur responsive to lockout command 410-1, a transition from NE state S to NE state X may occur responsive to lockout command 410-2, a transition from NE state B to NE state X may occur responsive to lockout command 410-3, and a transition from NE state R to NE state X may occur responsive to lockout command 410-4. Furthermore, a transition from NE state X to NE state A may occur responsive to receiving clear command 412-1, a transition from NE state X to NE state S may occur responsive to receiving clear command 412-2, a transition from NE state X to NE state B may occur responsive to receiving clear command 412-3, and a transition from NE state X to NE state R may occur responsive to receiving clear command 412-4.

Advancing now to FIG. 5, a state diagram of selected elements of an embodiment of controller state machine 500 is illustrated. As shown, controller state machine 500 may represent actions, events, and states implemented by an central controller, such as central controller 302 (see FIG. 3), according to the methods described herein, for a given instance of a network element. In other words, the central controller may maintain an instance of controller state machine 500 for each network element managed by the central controller. In controller state machine 500, dashed lines for states and arrows, representing transitions between states, depict actions taken autonomously by central controller 302, while solid lines for states depict NE states for the managed network element. Controller state machine 500 may operate in conjunction with network element machine 400 (see FIG. 4), as described above. It is noted that certain elements depicted in controller state machine 500 may be rearranged or omitted in various embodiments. Also, controller state machine 500 may represent a subset of actions and states that central controller 302 is enabled to implement for operational purposes. In particular, it is noted that controller state machine 500 may include the events and NE state transitions depicted in network element state machine 400, but which have been omitted from FIG. 5 for descriptive clarity. In this manner, controller state machine 500 may remain synchronized with respect to NE states with the network element, which may send notifications to the controller when NE state changes and/or other events occur.

In controller state machine 500 in FIG. 5, the central controller (also referred to simply as the 'controller') may initiate a manual switch from NE state A to NE state B by sending controller command 406-1 to the network element, while the controller transitions internally from NE state A to controller state V, indicating that a manual switch is pending. While in controller state V, the controller may wait for confirmation from the NE element that NE state B was successfully attained, after which the controller may transition from controller state V to NE state B as indicated by event 502-1. Similarly, the controller may initiate a manual switch from NE state B to NE state A by sending controller command 406-2 to the network element, while the controller transitions internally from NE state B to controller state V, indicating that a manual switch is pending. While in controller state V, the controller may wait for confirmation from the NE element that NE state A was successfully attained, after which the controller may transition from controller state V to NE state A as indicated by event 502-2.

In controller state machine 500 of FIG. 5, the controller may transition from NE state R to NE state A using a WTR function, as will now be described in further detail. Specifically, the controller may receive a notification from the network element while in NE state R that W has become active, corresponding to event 504, resulting the controller transitioning to controller state Y, in which a WTR timer (not shown) is started. The controller may remain in controller state Y until the WTR timer expires, resulting in event 506 that transitions the controller from controller state Y to controller state Z. In controller state Z, the controller may instruct the network element to select W and de-select P corresponding to controller command 414 (see FIG. 4). After controller command 414 is successfully executed by the network element and the network element responds to the controller with a notification that NE state A was attained, event 510 indicates the controller transitioning to NE state A.

Also shown in controller state machine 500 is lockout state (NE state X) for the network element, which, as mentioned above, may be activated by the network element with lockout command 410 (see FIG. 4) from any of NE states A, B, R, and S. When the network element issues lockout command 410 and transitions to NE state X, a corresponding notification may be sent to the controller, resulting in event 508 sending the controller to NE state X. In NE state X (lockout), the condition parameters and selection parameters for W and P may remain unchanged, but all network traffic may be suppressed for the network element. NE state X may be released and the network element may return to the NE state prior to lockout responsive to the controller sending clear command 412 to the network element. It is noted that in some embodiments (not shown), event 508 may represent a lockout command initiated by the controller to instruct the network element to transition to NE state X, which may occur prior to lockout command 410 at the network element. Accordingly, a transition from NE state A to NE state X may occur responsive to event 508-1, a transition from NE state S to NE state X may occur responsive to event 508-2, a transition from NE state B to NE state X may occur responsive to event 508-3, and a transition from NE state R to NE state X may occur responsive to event 508-4. Furthermore, a transition from NE state X to NE state A may occur responsive to controller clear command 412-1, a transition from NE state X to NE state S may occur responsive to controller clear command 412-2, a transition from NE state X to NE state B may occur responsive to controller clear command 412-3, and a transition from NE state X to NE state R may occur responsive to controller clear command 412-4.

Figure 6:
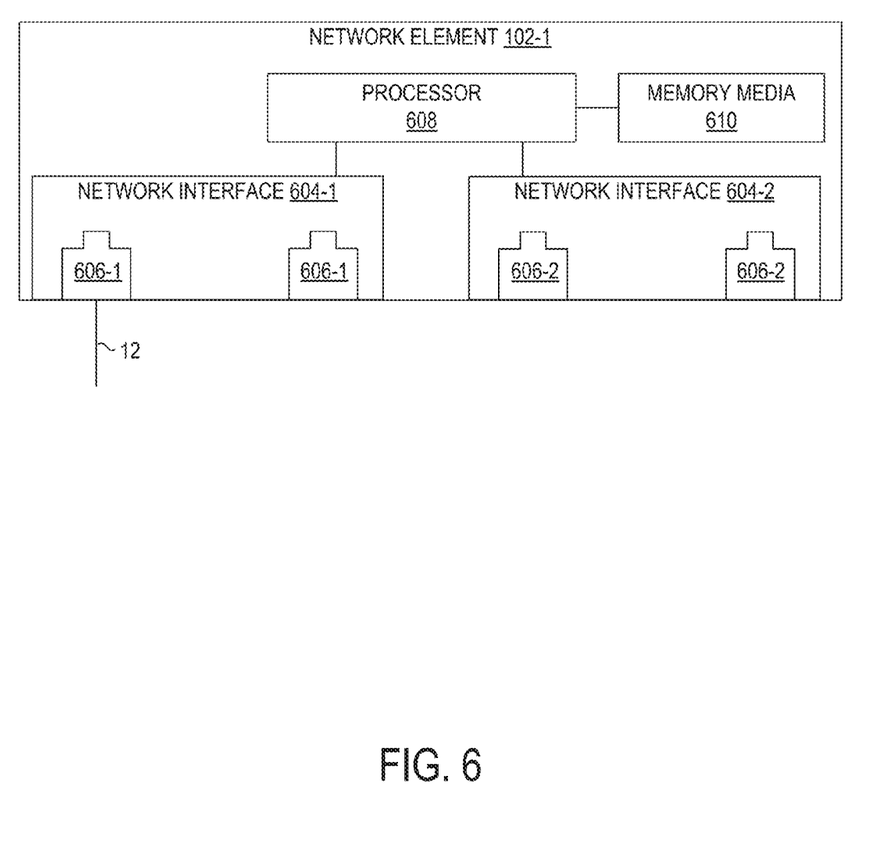
FIG. 6 is a block diagram of selected elements of an embodiment of a network element.

Referring now to FIG. 6, a block diagram of selected elements of an embodiment of network element 102-1, which is represented as a particular embodiment of network elements 102 (see FIG. 1) for descriptive purposes, is illustrated. Network element 102-1, as shown, includes processor 608 and memory media 610, along with network interface 604-1 having ports 606-1 and network interface 604-2 having ports 606-2.

As depicted in FIG. 6, each network element 102 may include processor 608 and memory media 610 that may store instructions executable by processor 608. As shown, memory media 610 may represent volatile, non-volatile, fixed, and/or removable media, and may be implemented using magnetic and/or semiconductor memory. Memory media 610 is capable of storing instructions (i.e., code executable by processor 608) and/or data. Memory media 210 and/or at least a portion of contents of memory media 610 may be implemented as an article of manufacture comprising non-transitory computer readable memory media storing processor-executable instructions. Memory media 610 may store instructions including an operating system (OS), which may be any of a variety of operating systems, such as a UNIX variant, LINUX, a Microsoft Windows® operating system, or a different operating system. It is noted that network interface 604 may also include a processor and memory media (not shown) in certain embodiments. A processor and memory included with network element 102, such as processor 608 and memory media 610 or another processor and memory media, may implement linear path protection in a centralized controller environment, as described herein. For example, memory media 610 may store instructions to implement network element state machine 400 (see FIG. 4) at network element 102.

In FIG. 6, network elements 102 are shown including at least one network interface 604, which provides a plurality of ports 606 that receive a corresponding transmission media 12 (see also FIG. 1). Ports 606 and transmission media 12 may represent galvanic and/or optical network connections. Each network interface 604 may include any suitable system, apparatus, or device configured to serve as an interface between a network element 102 and transmission medium 12. Each network interface 604 may enable its associated network element 102 to communicate with other network elements 102 using any of a variety of transmission protocols and/or standards. Network interface 604 and its various components may be implemented using hardware, software, or any combination thereof. In certain embodiments, network interfaces 604 may include a network interface card (not shown in FIG. 6). In various embodiments, network interfaces 604 may include a line card (not shown in FIG. 6). Each port 606 may include a system, device or apparatus configured to serve as a physical interface between corresponding transmission medium 12 and network interface 604. In some embodiments, port 606 may comprise an Ethernet port. Although in FIG. 6 network interfaces 604 are shown with 2 instances of ports 606 for descriptive clarity, in different embodiments, network interfaces 604 may be equipped with different numbers of ports 606 (e.g., 4, 6, 8, 16 ports, etc.). In various embodiments, network element 102 may be configured to receive data and route such data to a particular network interface 604 and/or port 606 based on analyzing the contents of the data and/or based on a characteristic of a signal carrying the data (e.g., a wavelength and/or modulation of the signal). In certain embodiments, network element 102 may include a switching element (not shown) that may include a switch fabric (SWF).

Figure 7:
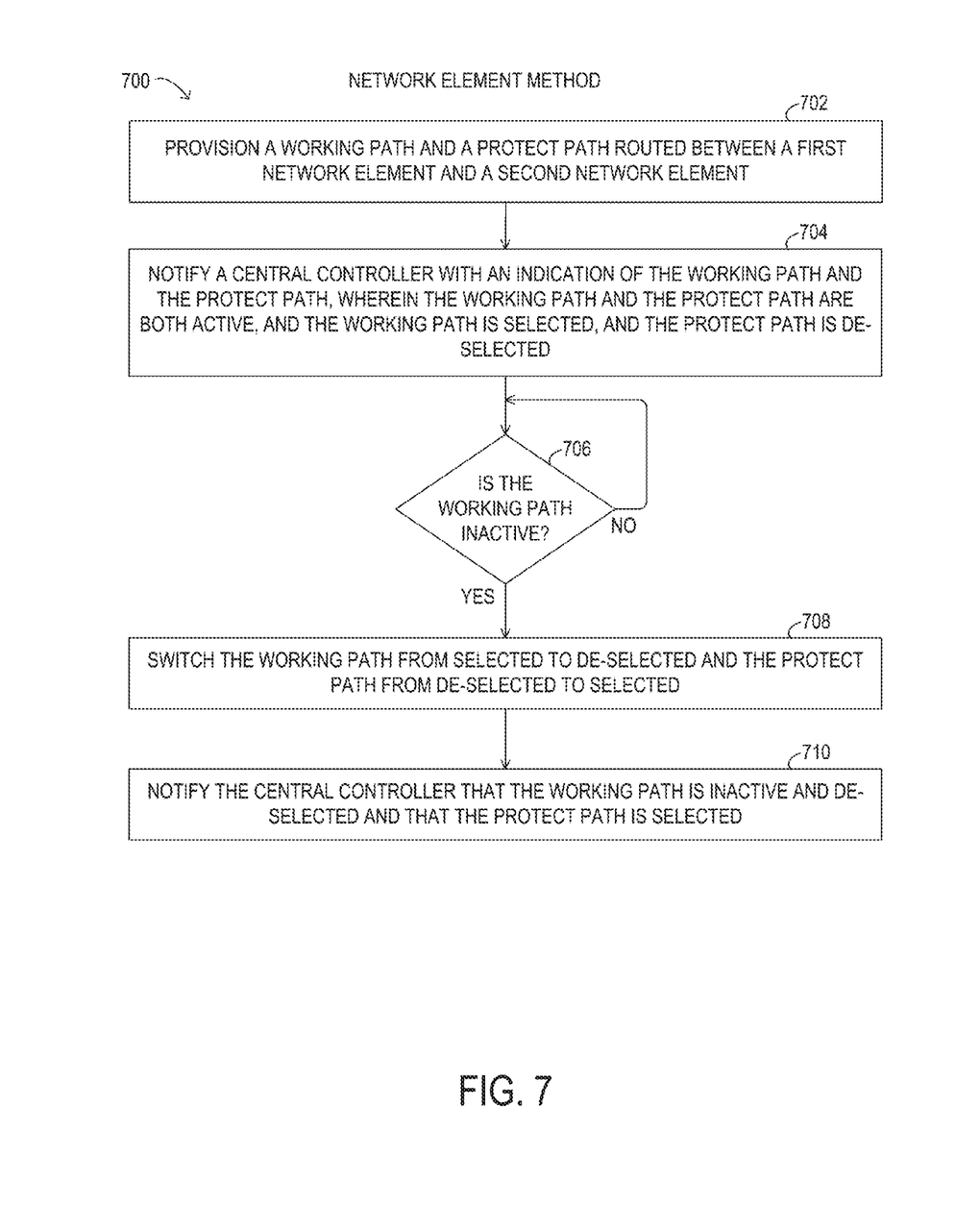
FIG. 7 is a flow chart depicting selected elements of an embodiment of a network element method for linear path protection in a centralized controller environment.

Turning now to FIG. 7, a block diagram of selected elements of an embodiment of method 700 for linear path protection in a centralized controller environment, as described herein, is depicted in flow-chart form. Method 700 may be performed using network element 102 (see FIGS. 1 and 2). It is noted that certain operations described in method 700 may be optional or may be rearranged in different embodiments.

In FIG. 7, method 700 may begin by provisioning (operation 702) a working path and a protect path routed between a first network element and a second network element. A central controller may be notified (operation 704) with an indication of the working path and the protect path, wherein the working path and the protect path are both active, and the working path is selected, and the protect-path is deselected. The indication in operation 704 may correspond to NE state A (see FIGS. 4 and 5). Then a decision may be made whether the working path is inactive (operation 706). Operation 706 may correspond to event 402-1 (see FIG. 4). When the result of operation 706 is NO, method 700 may loop back to operation 706. When the result of operation 706 is YES, the working path may be switched (operation 708) from selected to de-selected and the protect path from de-selected to selected. Operation 708 may correspond to NE state R (see FIG. 4). The central controller may be notified (operation 710) that the working path is inactive and de-selected and that the protect pat is selected. It is noted that method 700 may include various other commands, actions, and/or events in network element state machine 400 (not shown in FIG. 7, see FIG. 4).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for linear path protection for a software-defined network (SDN) monitored by a central controller, comprising:
    provisioning, at a first network element within the SDN, a working path and a protect path routed between the first network element and a second network element within the SDN;
    notifying, by the first network element, the central controller with an indication of the working path and the protect path, wherein the working path and the protect path are both active, wherein the working path is selected and the protect path is de-selected;
    detecting, by the first network element, that the working path is inactive;
    responsive to the detecting that the working path is inactive and without receiving a switching command from the central controller, switching, by the first network element, the working path from selected to de-selected and the protect path from de-selected to selected; and
    notifying, by the first network element, the central controller that the working path is inactive and de-selected and that the protect path is selected,
    wherein the central controller maintains a path state associated with the working path and the protect path for the first network element and the second network element, respectively, wherein the path state specifies, for a path selected from a working path and a protect path:
    whether the path is active or inactive; and
    whether the path is selected or de-selected.

2. The method of claim 1, further comprising:
    when the working path is inactive and de-selected and the protect path is selected, detecting, by the first network element, that the working path is restored to be active;
    notifying, by the first network element, the central controller that the working path is restored to be active;
    receiving, at the first network element, a restore command from the central controller;
    responsive to the restore command, switching, by the first network element, the working path from de-selected to selected and the protect path from selected to de-selected; and
    notifying, by the first network element, the central controller that the restore command has been executed.

3. The method of claim 1, further comprising:
    when the working path and the protect path are both active, and the working path is selected and the protect path is de-selected, receiving, at the first network element, a first manual switch command from the central controller;
    responsive to the first manual switch command, switching, by the first network element, the working path to de-selected and the protect path to selected; and
    notifying, by the first network element, the central controller that the first manual switch command has been executed.

4. The method of claim 3, further comprising:
    when the working path and the protect path are both active, and the working path is de-selected and the protect path is selected, receiving, at the first network element, a second manual switch command from the central controller;
    responsive to the second manual switch command, switching, by the first network element, the working path to selected and the protect path to de-selected; and
    notifying, by the first network element, the central controller that the second manual switch command has been executed.

5. The method of claim 1, further comprising:
    initiating, by the first network element, a lockout of a selected network path, the selected network path selected from the working path and the protect path, wherein the lockout prevents network traffic from being routed over the selected network path;
    notifying, by the first network element, the central controller of the lockout;
    receiving, at the first network element, a clear command from the central controller; and
    responsive to receiving the clear command, clearing, by the first network element, the lockout, wherein network traffic is routed over the selected network path.

6. The method of claim 1, further comprising:
    monitoring, by the first network element, the working path and the protect path, respectively, for a condition parameter selected from active and inactive; and
    based on the monitoring, reporting, by the first network element to the central controller, the condition parameter for the working path and the protect path, respectively.

7. The method of claim 1, further comprising:
    when the protect path is selected and active and the working path is de-selected, detecting, by the network element, that the protect path has become inactive;
    switching, by the first network element, the protect path to de-selected and the working path to selected; and notifying, by the first network element, the central controller that the working path is selected.

8. The method of claim 7, further comprising:
when the protect path is de-selected and inactive and the working path is selected, detecting, by the network element, that the protect path has become active; and
notifying, by the first network element, the central controller that the protect path is active.

9. The method of claim 1, wherein the path state maintained by the central controller for the first network element is based on notifications sent by the first network element.

10. A first network element for linear path protection for a software-defined network (SDN) monitored by a central controller, comprising:
a non-transitory computer readable memory media; and
a processor configured to access the non-transitory computer readable memory media, wherein the memory media store processor-executable instructions, the instructions, when executed by the processor, cause the processor to:
provision a working path and a protect path routed between the first network element and a second network element within the SDN;
notify the central controller with an indication of the working path and the protect path, wherein the working path and the protect path are both active, wherein the working path is selected and the protect path is de-selected;
detect that the working path is inactive;
responsive to a detection that the working path is inactive and without receiving a switching command from the central controller, switch the working path from selected to de-selected and the protect path from de-selected to selected; and
notify the central controller that the working path is inactive and de-selected and that the protect path is selected,
wherein the central controller maintains a path state associated with the working path and the protect path for the first network element and the second network element, respectively, wherein the path state specifies, for a path selected from a working path and a protect path:
whether the path is active or inactive; and
whether the path is selected or de-selected.

11. The first network element of claim 10, further comprising instructions to:
when the working path is inactive and de-selected and the protect path is selected, detect that the working path is restored to be active;
notify the central controller that the working path is restored to be active;
receive a restore command from the central controller;
responsive to the instructions to receive the restore command, switch the working path from de-selected to selected and the protect path from selected to de-selected; and
notify the central controller that the restore command has been executed.

12. The first network element of claim 10, further comprising instructions to:

when the working path and the protect path are both active, and the working path is selected, and the protect path is de-selected, receive a first manual switch command from the central controller;
responsive to the instructions to receive the first manual switch command, switch the working path to de-selected and the protect path to selected; and
notify the central controller that the first manual switch command has been executed.

13. The first network element of claim 12, further comprising instructions to:
when the working path and the protect path are both active, and the working path is de-selected and the protect path is selected, receive a second manual switch command from the central controller;
responsive to the instructions to receive the second manual switch command, switch the working path to selected and the protect path to de-selected; and
notify the central controller that the second manual switch command has been executed.

14. The first network element of claim 10, further comprising instructions to:
initiate a lockout of a selected network path, the selected network path selected from the working path and the protect path, wherein the lockout prevents network traffic from being routed over the selected network path;
notify the central controller of the lockout;
receive a clear command from the central controller; and
responsive to the instructions to receive the clear command, clear the lockout, wherein network traffic is routed over the selected network path.

15. The first network element of claim 10, further comprising instructions to:
monitor the working path and the protect path, respectively, for a condition parameter selected from active and inactive; and
based on the instructions to monitor, report, to the central controller, the condition parameter for the working path and the protect path, respectively.

16. The first network element of claim 10, further comprising instructions to:
when the protect path is selected and active and the working path is de-selected, detect that the protect path is inactive;
switch the protect path to de-selected and the working path to selected; and
notify the central controller that the working path is selected.

17. The first network element of claim 16, further comprising instructions to:
when the protect path is de-selected and inactive and the working path is selected, detect that the protect path is active; and
notify the central controller that the protect path is active.

18. The first network element of claim 10, wherein the path state maintained by the central controller for the first network element is based on notifications sent by the first network element.

* * * * *